US012718685B2

(12) United States Patent
Ha

(10) Patent No.: US 12,718,685 B2
(45) Date of Patent: Aug. 25, 2026

(54) SERVER AND METHOD OF CONTROLLING THE SAME

(71) Applicants: Hyundai Motor Company, Seoul (KR); Kia Corporation, Seoul (KR)

(72) Inventor: Seungwoo Ha, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 257 days.

(21) Appl. No.: 18/517,860

(22) Filed: Nov. 22, 2023

(65) Prior Publication Data

US 2024/0194062 A1 Jun. 13, 2024

(30) Foreign Application Priority Data

Dec. 7, 2022 (KR) ........................ 10-2022-0169915

(51) Int. Cl.
*G08G 1/01* (2006.01)
*G08G 1/052* (2006.01)
*G08G 1/0967* (2006.01)

(52) U.S. Cl.
CPC ......... *G08G 1/0141* (2013.01); *G08G 1/0112* (2013.01); *G08G 1/0129* (2013.01); *G08G 1/0133* (2013.01); *G08G 1/052* (2013.01); *G08G 1/096725* (2013.01); *G08G 1/096775* (2013.01)

(58) Field of Classification Search
CPC .. G08G 1/0141; G08G 1/0112; G08G 1/0129; G08G 1/0133; G08G 1/052; G08G 1/096725; G08G 1/096775
USPC .......................................................... 701/118
See application file for complete search history.

(56) References Cited

U.S. PATENT DOCUMENTS 9,898,931 B1 * 2/2018 Nickolaou ....... G08G 1/096791
10,037,689 B2 * 7/2018 Taylor .................. G05D 1/0285
10,414,407 B1 * 9/2019 Slusar ................... B60W 40/09
10,762,786 B1 * 9/2020 Dewey ................... G06Q 40/08
11,030,890 B2 * 6/2021 Werner .................. G08G 1/048
11,557,207 B1 * 1/2023 Dewey ................... G06Q 40/08
11,590,934 B2 * 2/2023 Moeller ............. G06Q 30/0635
11,781,883 B1 * 10/2023 Dabell ............... G01C 21/3874 701/409
12,094,342 B2 * 9/2024 Dewey ................... G06Q 40/08
12,406,584 B2 * 9/2025 Dewey ................... G06Q 40/08
12,488,578 B1 * 12/2025 Nath ...................... G06V 10/82
2005/0065711 A1 * 3/2005 Dahlgren ......... G08G 1/096775 701/117

(Continued)

*Primary Examiner* — Luis A Martinez Borrero
(74) *Attorney, Agent, or Firm* — Banner & Witcoff, Ltd.

(57) ABSTRACT

A computing device includes: a communicator configured to communicate with a target vehicle and a plurality of vehicles; and a controller electrically connected to the communicator, wherein the controller is configured to collect vehicle data of the target vehicle and the plurality of vehicles, determine a traffic volume in an area in which the target vehicle is traveling, based on the collected vehicle data, determine a reference driving pattern based on the traffic volume in the area in which the target vehicle is traveling, determine a driving pattern of the target vehicle based on the vehicle data of the target vehicle, compare the driving pattern of the target vehicle with the reference driving pattern, and determine a safe driving index of the target vehicle based on a driving pattern difference between the driving pattern of the target vehicle and the reference driving pattern.

20 Claims, 9 Drawing Sheets

(56) References Cited

U.S. PATENT DOCUMENTS

| | | | | |
|---|---|---|---|---|
| 2015/0243165 | A1* | 8/2015 | Elsheemy | G08G 1/096775 340/906 |
| 2016/0363935 | A1* | 12/2016 | Shuster | G08G 1/0141 |
| 2016/0379486 | A1* | 12/2016 | Taylor | G08G 1/08 340/905 |
| 2017/0221362 | A1* | 8/2017 | Gunaratne | G08G 1/166 |
| 2018/0061253 | A1* | 3/2018 | Hyun | B60W 30/12 |
| 2020/0005643 | A1* | 1/2020 | Park | G08G 1/161 |
| 2020/0294401 | A1* | 9/2020 | Kerecsen | G08G 1/205 |
| 2021/0125076 | A1* | 4/2021 | Zhang | G06N 3/045 |
| 2021/0316720 | A1* | 10/2021 | Dewey | G06Q 40/08 |
| 2022/0161760 | A1* | 5/2022 | Moeller | G08B 21/182 |
| 2022/0161761 | A1* | 5/2022 | Moeller | H04L 9/0643 |
| 2023/0169867 | A1* | 6/2023 | Dewey | G06Q 40/08 701/117 |

* cited by examiner

SERVER AND METHOD OF CONTROLLING THE SAME

CROSS-REFERENCE TO RELATED APPLICATION

This application is based on and claims the benefit of priority to Korean Patent Application No. 10-2022-0169915, filed on Dec. 7, 2022 in the Korean Intellectual Property Office, the disclosure of which is incorporated herein by reference.

BACKGROUND

Usage-Based Insurance (UBI) may provide a service that uses driving habits such as mileage and driving time to calculate a UBI index and discounts the insurance premium based on the UBI index.

Behavior-Based Insurance (BBI) may be a more advanced concept than UBI. BBI may provide a service that uses driving habits such as sudden acceleration, sudden braking, sudden stopping, and sudden turning to calculate a BBI index, and discounts insurance premiums based on the BBI index.

UBI index and BBI index are types of driver's safe driving index. In general, subscribers with higher safe driving index are given benefits such as discounted insurance premiums, while those with lower safe driving index are charged higher insurance premiums.

Some safe driving index only represents the actual driving information of the vehicle. and thus has limitations in reflecting actual road conditions. For example, in a situation where there is heavy traffic and the vehicle is forced to drive at a slow speed, if the driver changes lanes urgently, the safe driving index often does not reflect the situation.

In addition, when a driver does not slow down while changing lanes to turn a corner on a highway, it becomes a very dangerous driving pattern. However, based on the safe driving index, a system may only evaluate the pattern as a constant speed driving pattern and thus it may not reflect the driving pattern in the driving safety index.

Therefore, there are limitations in improving the accuracy and reliability of the safe driving index because some systems implementing the above safe driving index features cannot reflect actual road conditions and actual driving patterns in the index.

SUMMARY

The following summary presents a simplified summary of certain features. The summary is not an extensive overview and is not intended to identify key or critical elements.

Aspects of the disclosure relate to a server and a control method thereof that may determine a safe driving index quantified by analyzing a driver's driving propensity from driving data of a vehicle.

An aspect of the disclosure provides a server and a method of controlling a server that may determine a driver's safe driving index more accurately and reliably by reflecting actual road conditions and actual driving patterns.

Additional aspects of the disclosure will be set forth in part in the description which follows and, in part, will be obvious from the description, or may be learned by practice of the disclosure.

A computing device may comprise: a communication device configured to communicate with a target vehicle and a plurality of vehicles; and a controller coupled to the communication device, wherein the controller is configured to: collect first vehicle data of the target vehicle and second vehicle data of the plurality of vehicles, determine, based on the first vehicle data and the second vehicle data, a traffic volume in an area in which the target vehicle is traveling, determine, based on the traffic volume in the area in which the target vehicle is traveling, a reference driving pattern, determine, based on the first vehicle data, a driving pattern of the target vehicle, compare the driving pattern of the target vehicle with the reference driving pattern, and determine, based on a driving pattern difference between the driving pattern of the target vehicle and the reference driving pattern, a safe driving index of the target vehicle. The computing device may transmit the safe driving index of the target vehicle to at least one device associated with at least one of: autonomous controls, traffic controls, or vehicle insurance.

Based on the traffic volume in the area in which the target vehicle is traveling being greater than a preset traffic volume, the controller may be configured to determine the reference driving pattern as an average driving pattern of vehicles traveling in the area in which the target vehicle is traveling.

The controller may be configured to determine the reference driving pattern as an average driving pattern of vehicles traveling, during a time period, on a road segment on which the target vehicle is travelling during the time period.

The controller may be configured to determine the average driving pattern based on at least one of a speed or a steering angle of the vehicles traveling in the road segment during the time period.

Based on the traffic volume in the area in which the target vehicle is traveling being less than a preset traffic volume, the controller may be configured to determine the reference driving pattern as an average driving pattern of vehicles previously traveled in the area in which the target vehicle is traveling.

The controller may be configured to determine the average driving pattern based on at least one of a speed or a steering angle of vehicles previously traveled on a road segment on which the target vehicle is traveling.

Based on the traffic volume in the area in which the target vehicle is traveling being less than a preset traffic volume, the controller may be configured to determine the reference driving pattern as a driving pattern according to a safety class of a road segment in which the target vehicle is traveling.

The controller may be configured to determine a risk level according to the safety class of the road segment in which the target vehicle is traveling, determine a safe driving pattern according to the risk level, and determine the safe driving pattern as the reference driving pattern.

The controller may be configured to determine a preset driving pattern corresponding to a traffic volume of a road segment on which the target vehicle is traveling as the reference driving pattern.

The controller may be configured to determine a traffic volume of a road segment on which the target vehicle is traveling based on a quantity of vehicle data of vehicles traveling on the road segment during a same time period.

The controller may be configured to transmit the safe driving index and the driving pattern of the target vehicle to the at least one device. The at least one device (e.g., a server, a vehicle, a roadside unit, etc.) may be configured to change, based on the safe driving index of the target vehicle being a dangerous safe driving index, at least one driving pattern of at least one second vehicle in accordance with a dangerous driving pattern of the target vehicle.

A method may comprise: collecting, by a computing device, first vehicle data of a target vehicle and second vehicle data of a plurality of vehicles; determining, based on the first vehicle data and the second vehicle data, a traffic volume in an area in which the target vehicle is traveling; determining, based on the traffic volume in the area in which the target vehicle is traveling, a reference driving pattern; determining, based on the first vehicle data, a driving pattern of the target vehicle; comparing the driving pattern of the target vehicle with the reference driving pattern; and determining, based on a driving pattern difference between the driving pattern of the target vehicle and the reference driving pattern, a safe driving index of the target vehicle. The method may further comprise transmitting the safe driving index of the target vehicle to at least one device associated with at least one of: autonomous controls, traffic controls, or vehicle insurance.

The determining of the reference driving pattern may comprise: based on the traffic volume in the area in which the target vehicle is traveling being greater than a preset traffic volume, determining the reference driving pattern as an average driving pattern of vehicles traveling in the area in which the target vehicle is traveling.

The determining of the reference driving pattern may comprise determining the reference driving pattern as an average driving pattern of vehicles traveling, during a time period, on a road segment on which the target vehicle is traveling during the time period.

The determining of the reference driving pattern may comprise determining the average driving pattern based on at least one of a speed or a steering angle of the vehicles traveling in the road segment during the time period.

The determining of the reference driving pattern may comprise: based on the traffic volume in the area in which the target vehicle is traveling being less than a preset traffic volume, determining the reference driving pattern as an average driving pattern of vehicles previously traveled in the area in which the target vehicle is traveling.

The determining of the reference driving pattern may comprise determining the average driving pattern based on at least one of a speed or a steering angle of vehicles previously traveled on a road segment on which the target vehicle is traveling.

The determining of the reference driving pattern may comprise: based on a traffic volume in the area in which the target vehicle is traveling being less than a preset traffic volume, determining the reference driving pattern as a driving pattern according to a safety class of a road segment in which the target vehicle is traveling.

The determining of the reference driving pattern may comprise: determining a risk level according to the safety class of the road segment in which the target vehicle is traveling; determining a safe driving pattern according to the risk level; and determining the safe driving pattern as the reference driving pattern.

The determining of the reference driving pattern may comprise determining a preset driving pattern corresponding to a traffic volume of a road segment on which the target vehicle is traveling as the reference driving pattern.

The determining of the traffic volume in the area in which the target vehicle is travelling may comprise determining a traffic volume of a road segment on which the target vehicle is traveling based on a quantity of vehicle data of vehicles traveling on the road segment during a same time period.

The transmitting the safe driving index of the target vehicle may comprise transmitting the safe driving index and the driving pattern of the target vehicle to the at least one device. The at least one device may be configured to change, based on the safe driving index of the target vehicle being a dangerous safe driving index, at least one driving pattern of at least one second vehicle in accordance with a dangerous driving pattern of the target vehicle.

These and other features and advantages are described in greater detail below.

BRIEF DESCRIPTION OF THE DRAWINGS

These and/or other aspects of the disclosure will become apparent and more readily appreciated from the following description of the disclosure, taken in conjunction with the accompanying drawings of which.

DETAILED DESCRIPTION

Figure 1:
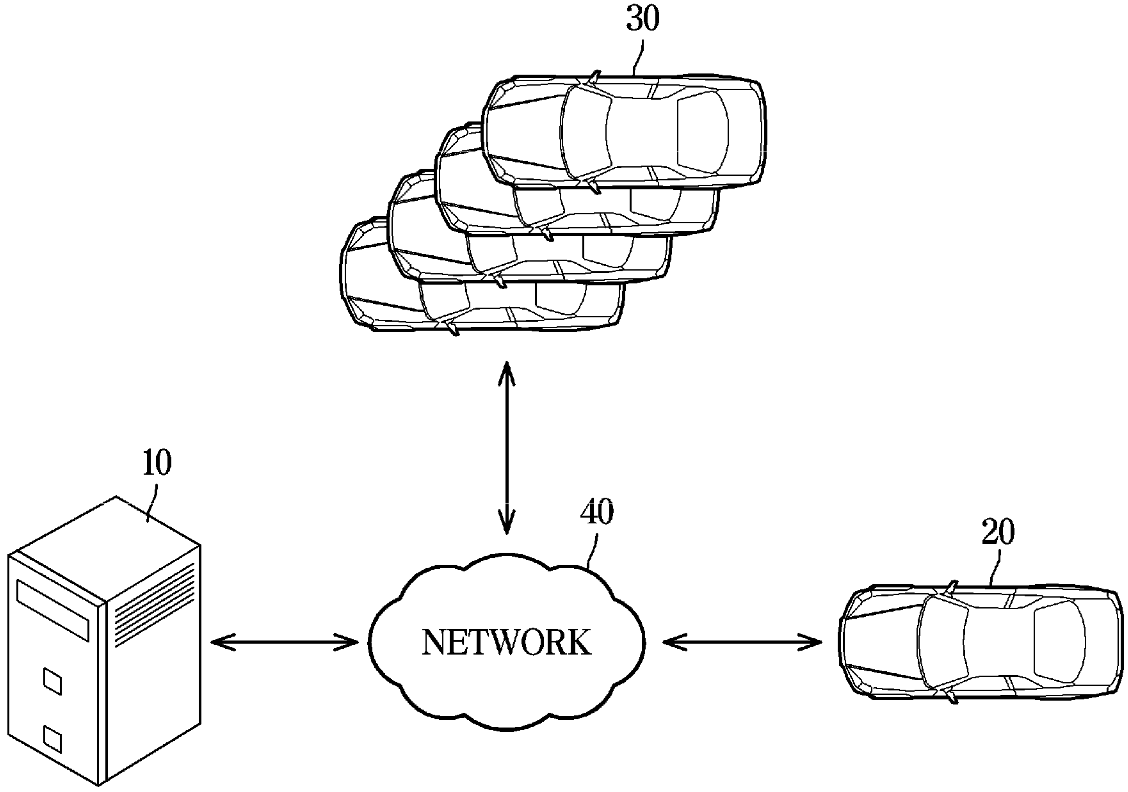
FIG. 1 is a diagram illustrating of a safe driving index judgment system to which a server.

Like reference numerals throughout the specification denote like elements. Also, this specification does not describe all the elements according to the disclosure, and descriptions well-known in the art to which the disclosure pertains or overlapped portions may be omitted. The terms such as "~part", "~member", "~module", "~device", and the like may refer to at least one process processed by at least one hardware or software. According to the disclosure, a plurality of "~parts", "~members", "~modules", "~devices" may be embodied as a single element, or a single of a "~part", "~member", "~module", "~device" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of at least one other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a diagram illustrating of a safe driving index judgment system to which a server.

Referring to FIG. 1, a server 10 may be a server operating a system associated with a safe driving index (e.g., a safe driving index evaluation system).

The server 10 may perform communication via a network 40 with a target vehicle 20 and a plurality of vehicles 30 participating in the safe driving index determination system (e.g., a safe driving index judgment system).

The safe driving index determination system may be a system for collecting driving data of a vehicle to determine and evaluate a safe driving index (e.g., that may be used as an evaluation index in insurance that links vehicle driving to insurance premium discounts, such as Usage-Based Insurance (UBI) and Behavior-Based Insurance (BBI)).

The server 10 may communicate with the target vehicle 20 via the network 40 to collect vehicle data of the target vehicle 20.

The server 10 may communicate with a plurality of vehicles 30 participating in the safe driving index determination system to collect vehicle data of the plurality of vehicles 30, respectively.

The vehicle data of the target vehicle 20 and the plurality of vehicles 30 may include driving information and location information.

The driving information may include vehicle information, such as speed, acceleration, and steering of the vehicles.

The target vehicle 20 and the plurality of vehicles 30 may obtain the driving information through a motion sensor that detects the movement of the vehicle while traveling.

In general, the vehicle may receive satellite signals from at least one satellite and recognize the current location of the vehicle based on the received satellite signals. The vehicle may recognize its current location using a global positioning system (GPS), a global navigation satellite system (GNSS), a global navigation satellite system (GLONASS), or the like. In an example, in recognizing the current location, the vehicle may acquire distance and time information corresponding to signals from a plurality of GPS satellites and recognize the current location of the vehicle based on the acquired distance and time information. In another example, the vehicle may receive a signal transmitted by a GNSS satellite and recognize the current location of the vehicle based on the distance from the GNSS satellite.

The target vehicle 20 and the plurality of vehicles 30 may obtain location information by receiving satellite signals.

The server 10 may use the vehicle data collected from the target vehicle 20 and the plurality of vehicles 30 to determine the actual road conditions in which the target vehicle 20 is traveling and the actual driving pattern of the target vehicle 20, and may determine the safe driving index of the target vehicle 20 based on the determined actual road conditions and the actual driving pattern to improve the accuracy and reliability of determining the safe driving index.

Figure 2:
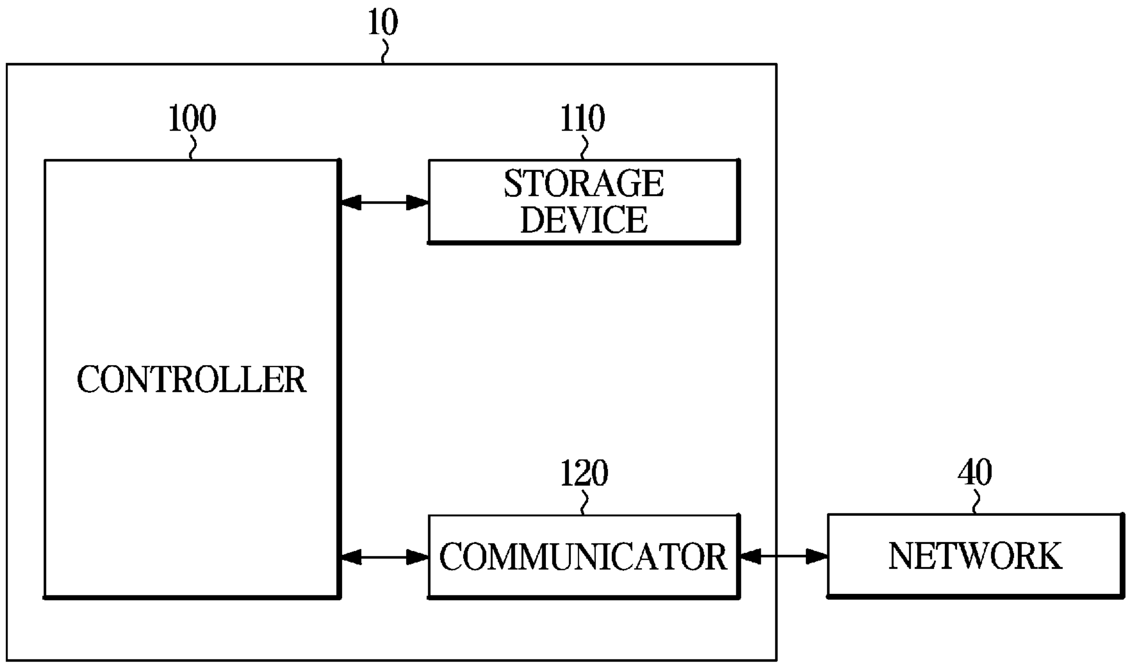
FIG. 2 is a control block diagram of a server.

FIG. 2 is a control block diagram of a server.

Referring to FIG. 2, the server 10 may include a controller 100, a storage device 110, and a communicator 120.

The controller 100 may be coupled (e.g., electrically connected) to the storage device 110 and the communicator 120.

The storage device 110 may store various data and programs to determine the safe driving index of the target device 20.

The storage device 110 may include volatile memory such as static random access memory (S-RAM) and dynamic random access memory (D-RAM), and non-volatile memory such as read only memory (ROM) and erasable programmable read only memory (EPROM).

The storage device 110 may store vehicle data of the target vehicle 20 and vehicle data of the plurality of vehicles 30 collected by the server 10.

The communicator 120 may include one or more components that enable communication with external devices through the network 40. For example, the communicator 120 may include at least one of a near field communication module, a wired communication module, and a wireless communication module. For example, the wireless communication module may include a signal conversion module for demodulating a wireless signal in analog form received from an external device via the wireless communication interface into a digital signal.

The communicator 120 may receive vehicle data from the target vehicle 20, and may receive vehicle data from a plurality of vehicles 30.

The communicator 120 may receive road traffic data from a traffic management server that manages traffic on a road.

The controller 100 may include at least one processor and a memory. If the memory and processor are plural, they may be integrated into one chip, or may be physically separated.

The controller 100 may receive vehicle data from the target vehicle 20 through the communicator 120, and may receive vehicle data from a plurality of vehicles 30 through the communicator 120.

The controller 100 may receive the road traffic data from the traffic management server through the communicator 120.

The controller 100 may store the received vehicle data of the target vehicle 20, the vehicle data of the plurality of vehicles 30, and the road traffic data in the storage device 110.

The controller 100 may determine the traffic volume in the area in which the target vehicle 20 is traveling based on the vehicle data of the target vehicle 20 and the vehicle data of the plurality of vehicles 30.

The controller 100 may determine a reference driving pattern based on the traffic volume in the area in which the target vehicle 20 is traveling.

The controller 100 may determine the driving pattern of the target vehicle 20 based on the vehicle data of the target vehicle 20.

The controller 100 may compare the driving pattern of the target vehicle 20 to the reference driving pattern, and determine a driving pattern difference between the driving pattern of the target vehicle 20 and the reference driving pattern based on the comparison result.

The controller 100 may determine a safe driving index of the target vehicle 20 based on the driving pattern difference between the driving pattern of the target vehicle and the reference driving pattern.

Thus, the server may more accurately and reliably determine the safe driving index of the driver of the target vehicle by reflecting actual road conditions and actual driving patterns.

Figure 3:
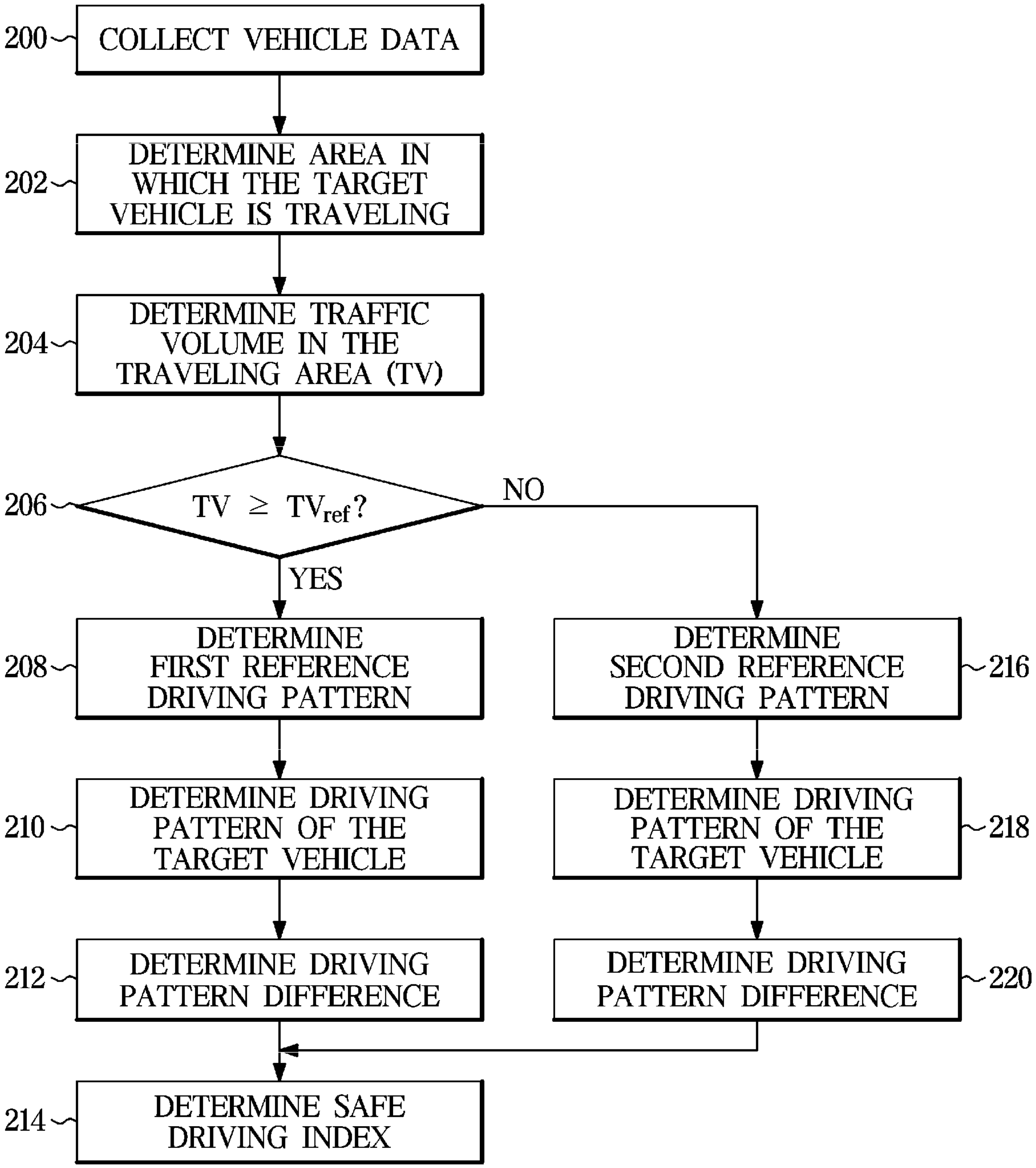
FIG. 3 is a flowchart illustrating a control method of a server.

FIG. 3 is a flowchart illustrating a control method of one or more computing devices (e.g., a server, a vehicle, etc.). Although FIG. 3 is described such that the server 10 performs the steps shown in FIG. 3, other computing devices may perform the steps described in FIG. 3 and/or additional operations.

Referring to FIG. 3, the server 10 may collect vehicle data of the target vehicle and the plurality of vehicles 30 (200).

The server 10 may determine an area in which the target vehicle 20 is traveling, based on its vehicle data (202).

The server 10 may determine the area in which the target vehicle 20 is traveling from the location information of the vehicle data of the target vehicle 20.

The server 10 may determine a traffic volume (TV) of the area in which the target vehicle 20 is traveling (204).

In this way, the server 10 can determine the area in which the target vehicle 20 is traveling and the traffic volume in the area.

The vehicle data may include location information along with driving data such as speed and acceleration of the vehicle. The location information of the vehicles may be used to classify vehicles traveling in the same area (e.g., the same road or zone) at the same time.

Thus, the area in which the target vehicle 20 is traveling and the traffic volume in the area may be determined.

In general, roads are divided into road types such as national roads, local roads, and highways, and are further divided into sections within those road types. For example, the Gyeongbu Expressway has a unique code to each section. It is divided into straight and curved roads.

Map data may include the name of each road, its type, unique information for each section, information on the division of straight and curved roads for each section, and location information for each section.

The server 10 may determine the area in which the target vehicle 20 is traveling on the map data, based on the location information of the target vehicle 20.

Figure 4:
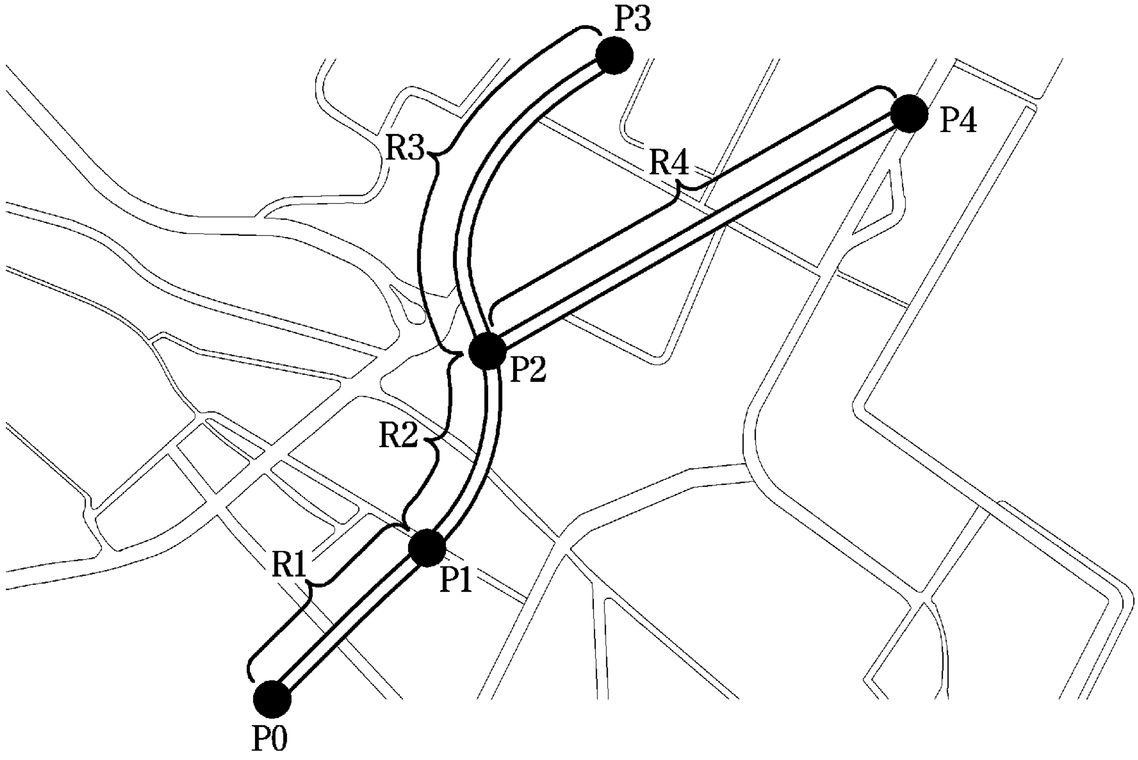
FIG. 4 is a diagram illustrating matching vehicle data collected from a plurality of vehicles to a road in an area in which a target vehicle is traveling, in a server.

FIG. 4 is a diagram illustrating matching vehicle data collected from a plurality of vehicles to a road in an area in which a target vehicle is traveling, in one or more computing devices (e.g., a server, a vehicle, etc.).

Referring to FIG. 4, a road in an area in which a target vehicle 20 is traveling may include a first road segment R1, a second road segment R2 connecting to the first road segment R1, a third road segment R3 branching in a first direction from the second road segment R2, and a fourth road segment R4 branching in a second direction from the second road segment R2.

The first road segment R1 is a road segment from P0 to P1. The second road segment R2 is a road segment from P1 to P2. The third road segment R3 is a road segment from P2 to P3. The fourth road segment R4 is a road segment from P2 to P4.

By matching the vehicle data of the plurality of vehicles 30 to the road segments R1, R2, R3, and R4 of the road in the area in which the target vehicle 20 is traveling, the vehicle data of vehicles traveling in the same road segment at a specific time can be grouped together.

By analyzing the vehicle data, it is possible to predict the traffic volume on a specific road segment at a specific time.

Vehicle data may be collected at preset intervals. When there is heavy traffic or congestion, it may take a long time to drive through a particular road segment. This means that the amount of vehicle data collected on this road segment is high.

Through the analysis of this vehicle data distribution, it may be possible to understand the traffic volume, and distinguish between moderate and light traffic.

Figure 5:
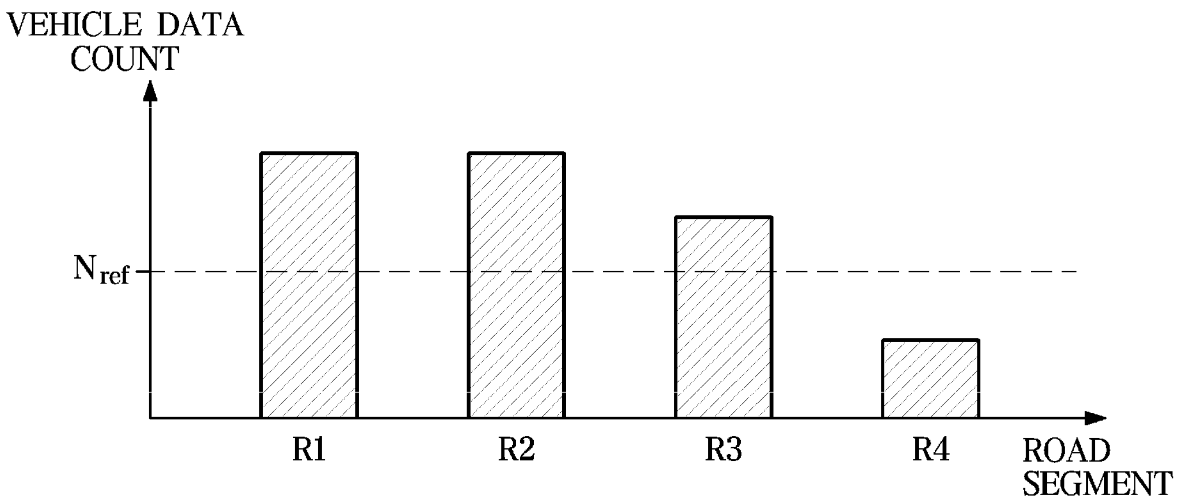
FIG. 5 is a diagram illustrating predicting traffic volume from a vehicle data count for each road segment, in a server.

FIG. 5 is a diagram illustrating predicting traffic volume from a vehicle data count for each road segment, in one or more computing devices (e.g., a server, a vehicle, etc.).

Referring to FIG. 5, a horizontal axis represents the road segment and a vertical axis represents the vehicle data count.

Each vehicle data count collected in the first road segment R1, second road segment R2, and third road segment R3 is shown to be greater than the reference data count (Nref). The vehicle data count collected from the fourth road segment R4 is shown to be less than the reference data count (Nref).

Therefore, the first road segment R1, the second road segment R2, and the third road segment R3 may be determined as high-traffic road segments. On the other hand, the fourth road segment R4 may be determined as low-traffic road segment.

Referring again to FIG. 3, the server 10 may compare the traffic volume (TV) of the area in which the target vehicle 20 is traveling with the preset traffic volume (TVref), and determine whether the traffic volume (TV) of the area in which the target vehicle is traveling is greater than or equal to the preset traffic volume (TVref) based on the comparison result (206).

If the server 10 determines that the traffic volume (TV) in the area in which the target vehicle 20 is traveling is greater than or equal to the preset traffic volume (TVref), the server 10 may determine the reference driving pattern is a first driving pattern, which may be the driving pattern of other vehicles 30 traveling in the same road segment during the same time period as the target vehicle 20 (208). In this case, the first driving pattern may be a driving pattern corresponding to the same road segment when traffic is heavy.

The server 10 may determine the driving pattern of the target vehicle 20 based on the driving information of the target vehicle 20 (210).

The server 10 may compare the driving pattern of the target vehicle 20 with the first driving pattern, and may determine a driving pattern difference between the driving pattern of the target vehicle 20 and the first driving pattern based on the result of the comparison (212).

If the server 10 determines that a particular road segment is in heavy traffic after classifying vehicle data, the server 10 may compare the driving pattern of target vehicle 20 to the driving pattern (first driving pattern) of other vehicles 30 traveling in the same road segment to determine a driving pattern difference.

In road segments with heavy traffic, it is necessary to drive the vehicle 20 in a similar manner to other vehicles traveling in the same road segment with similar patterns of driving in order to reduce the risk of accidents. Therefore, a relative comparison is needed, rather than an absolute standard.

By comparing the target vehicle 20 and other vehicles 30 traveling in the same road segment during a specific time period, the relative driving pattern difference between the target vehicle 20 and other vehicles 30 may be determined by evaluating how much the speed and/or steering angle change of the target vehicle 20 differs from the average speed change distribution and/or average steering angle change distribution of the other vehicles 30.

For example, after determining the average speed and/or average steering angle change of the other vehicles 30 collected on the first road segment R1 during a specific time, the relative driving pattern difference of the target vehicle 20 may be determined by determining how much the speed and/or steering angle change of the target vehicle 20 differs from the average speed and/or average steering angle change of the other vehicles 30.

If the server 10 may determine that the driving pattern of the target vehicle 20 is not deviated from the relative average driving pattern distribution, the server 10 may determine that the target vehicle 20 is driving in a similar pattern to the other vehicles 30.

However, if the server 10 determines that the target vehicle 20 is driving in a completely different driving pattern, such as driving at an excessively high speed compared to the other vehicles 30, and/or driving with a large change in steering angle, the server 10 may determine that the target vehicle 20 is driving abnormally with respect to the traffic flow on the road, and therefore is driving dangerously (e.g., recklessly) enough even if no accident has occurred.

Figure 6:
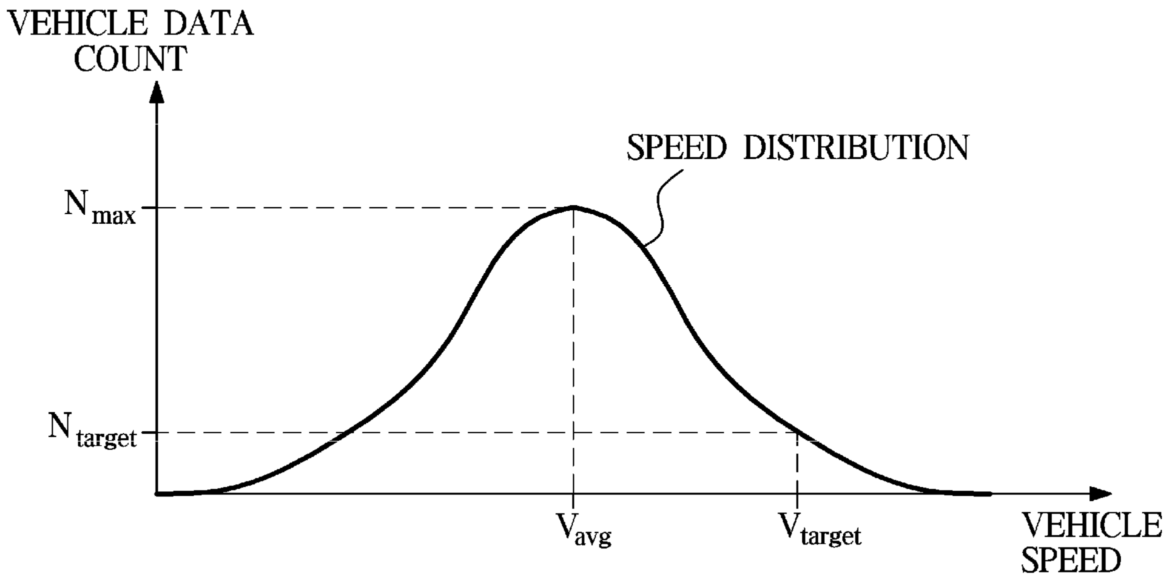
FIG. 6 is a diagram illustrating a speed distribution of a high-traffic road segment, in a server.

FIG. 6 is a diagram illustrating a speed distribution of a high-traffic road segment, in one or more computing devices (e.g., a server, a vehicle, etc.).

Referring to FIG. 6, a speed distribution of a first road segment R1 is shown.

The horizontal axis represents the vehicle speed, and the vertical axis represents the vehicle data count.

In the speed distribution of the first road segment R1, Vavg represents the average speed of the vehicles for which the most vehicle data was collected.

Assuming that the speed of the target vehicle 20 is Vtarget, the driving speed difference, which is the difference in driving patterns, may be determined based on how much faster the speed of the target vehicle 20 (Vtarget) is than the average speed (Vavg) of the vehicles 30 on the first road segment R1. Based on this driving speed difference, it is possible to estimate how dangerously the target vehicle 20 is driving.

Referring again to FIG. 3, the server 10 may determine a safe driving index of the target vehicle 20 based on the driving pattern difference between the driving pattern of the target vehicle 20 and the first driving pattern (214). The server 10 may transmit the safe driving index of the target vehicle 20 to other devices (e.g., other vehicles 30, a traffic controller server, an insurance company server) via the network 40, which may be used for autonomous controls, traffic controls, insurance premium discounts or surcharges, or the like.

The safe driving index may be of the target vehicle 20 may be determined by the target vehicle 20 and/or at least one vehicle of the plurality of vehicles 30. In an example, the at least one vehicle of the plurality of vehicles 30 may determine, based on the safe driving index of the target vehicle 20, that the target vehicle 20 is driving dangerously (e.g., recklessly), and determine, based on a driving pattern of the target vehicle 20, a safer driving route for the at least one vehicle of the plurality of vehicles 30. The safer driving route may be indicated to the driver of the least one vehicle of the plurality of vehicles 30 (e.g., via a display, a speaker, etc.) and/or may be transmitted to the target vehicle 20 and/or one or more of the plurality of vehicles 30. The safer driving route may be applied for an autonomous driving of the at least vehicle of the plurality of vehicles 30.

If the server 10 determines that the traffic volume (TV) in the area in which the target vehicle 20 is traveling is less than the preset traffic volume (TVref), the server may determine the reference driving pattern as the second driving pattern, which may be a driving pattern of other vehicles 30 that have previously traveled the same road segment (216). In this case, the second driving pattern may be a driving pattern corresponding to the same roadway segment when the traffic volume is low.

The server 10 may determine the driving pattern of the target vehicle 20 based on the driving information of the target vehicle 20 (218).

The server 10 may compare the driving pattern of the target vehicle 20 with the second driving pattern, and may determine a driving pattern difference between the driving pattern of the target vehicle 20 and the second driving pattern based on the result of the comparison (220).

The server 10 may determine a safe driving index of the target vehicle 20 based on the driving pattern difference between the driving pattern of the target vehicle 20 and the second driving pattern (214).

In the low-traffic road segment, a comparison with other vehicles 30 traveling in the same road segment during the same time period may not be critical. This is because even if the target vehicle 20 is traveling at a somewhat higher speed, as long as it stays in its lane, the likelihood of an accident may not be high.

For example, assuming that the target vehicle 20 is driving in the passing lane of a highway. As the passing lane is designed for faster than other lanes, it is necessary to analyze whether the driving pattern of the target vehicle 20 matches the driving pattern according to the safety class of the road, or whether it deviates significantly from the driving patterns of other vehicles 30 that have previously traveled on the same road segment at the same time.

In order to do this, it may be necessary to obtain the risk level of each road segment in relation to the safety class of the road. Data to classify the risk of roads according to their width, lanes, slope, type of road, etc. may be collected. Based on the collected data, the risk level of each road segment may be set (e.g., in advance). The risk level of each road segment may be stored (e.g., in advance) in the storage device 110 of the server 10, one or more vehicles, etc. And the average speed (or safe speed), which may be a safe driving pattern corresponding to the risk level of the road segment secured in advance, may be stored in the storage device 110 of the server 10, one or more vehicles, etc.

Figure 7:
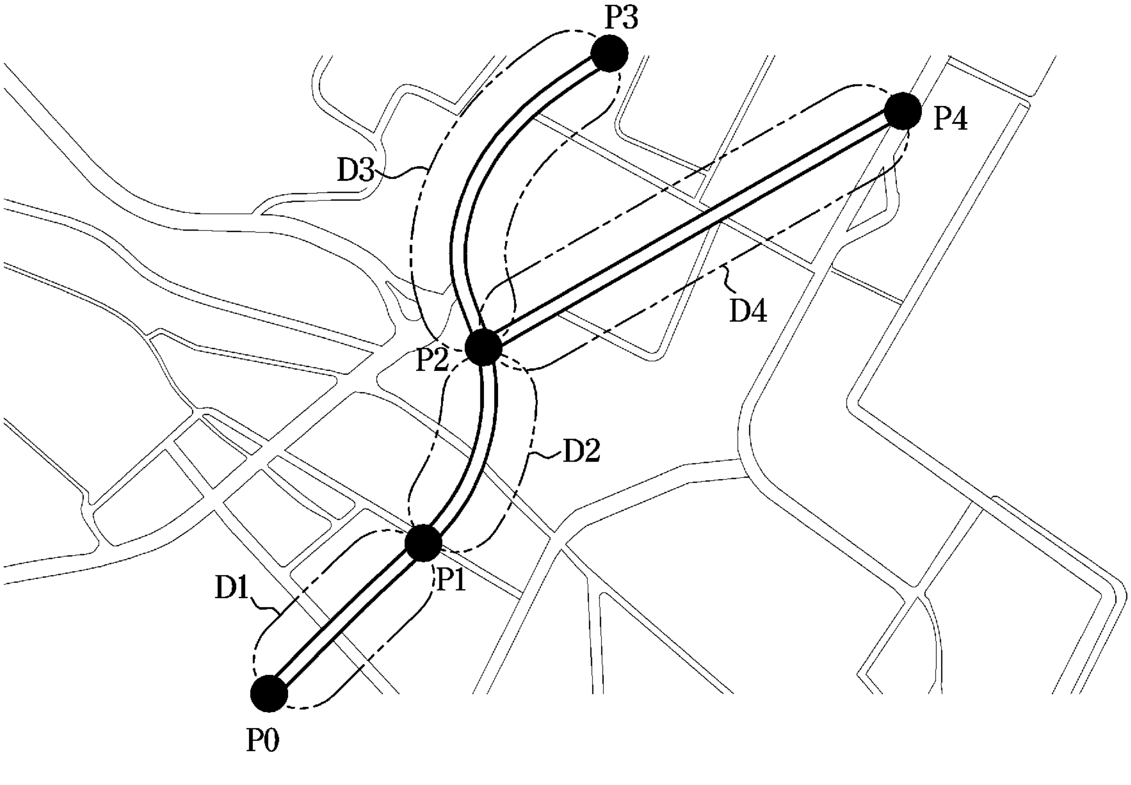
FIG. 7 is a diagram illustrating a risk level of each road segment in an area in which a target vehicle is traveling, in a server.

FIG. 7 is a diagram illustrating a risk level of each road segment in an area in which a target vehicle is traveling, in one or more computing devices (e.g., a server, a vehicle, etc.).

Referring to FIG. 7, the first road segment R1, the second road segment R2, the third road segment R3, and a fourth road segment R4 of a road in an area in which the target vehicle 20 is traveling may each have a preset risk level.

The first road segment R1 may be a straight segment and may be set to the first danger level D1 according to the A safety class.

The second road segment R2 may be a curved segment with a first curvature and may be set to the second risk level D2 according to the B safety level. The B safety class may be a lower safety class than the A safety class. The second risk level D2 may be a higher degree of danger than the first risk level D1.

The third road segment R3 may be a curved segment with a second curvature and may be set to the third risk level D3 according to the C safety class. The second curvature may be a higher curvature than the first curvature. The C safety class may be a lower safety class than the B safety class. The third risk level D3 may be a higher degree of danger than the second risk level D2.

The fourth road segment R4 may be a straight segment identical to (or similar to) the first road segment R1 and may be set to the first risk level D1 according to the A safety level.

On the other hand, the average speed, which may be the corresponding safe speed of vehicles for each risk level of the first road segment R1, second road segment R2, third road segment R3, and fourth road segment R4, may be pre-stored.

For example, the risk level of the first road segment R1 is the first risk level D1, so the average speed corresponding to the first risk level D1 may be Vavg1.

The risk of the second road segment R2 is the second risk D2, so the average speed corresponding to the second risk D2 may be Vavg2. Vavg2 may be a lower speed than Vavg1.

The risk of the third road segment R3 is the third risk D3, so the average speed corresponding to the third risk D3 can be Vavg3. Vavg3 may be a lower speed than Vavg2.

The risk level of the fourth road segment R4 is the same as the first risk level D1 of the first road segment R1, so the average speed corresponding to the first risk level D1 may be Vavg1.

For example, in the case of a highway, even if the speed limit is up to a first speed (e.g., 120 kph, 70 mph, etc.), the road danger level may be very high in sharp curve section, Therefore, if the target vehicle 20 is driving faster than a second speed (e.g., 100 kph, 60 mph, etc. that is lower than the first speed), which may be a safe speed corresponding to the danger level of this sharp curve section, it may be determined that the target vehicle 20 is driving dangerously (e.g., recklessly).

Figure 8:
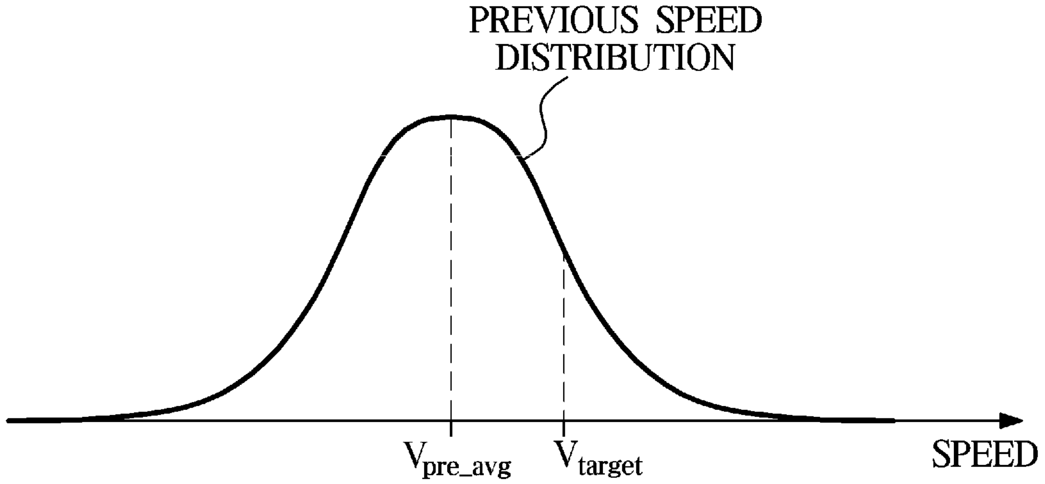
FIG. 8 is a diagram illustrating a speed distribution of a low-traffic road segment, in a server.

FIG. 8 is a diagram illustrating a speed distribution of a low-traffic road segment, in one or more computing devices (e.g., a server, a vehicle, etc.).

Referring to FIG. 8, the previous speed distribution of the fourth road segment R4 is shown.

If the average speed of the previous speed distribution is Vavg, and if the speed Vtarget of the target vehicle 20 is faster than the average speed Vavg, it may be determined that the target vehicle 20 is driving dangerously.

Figure 9:
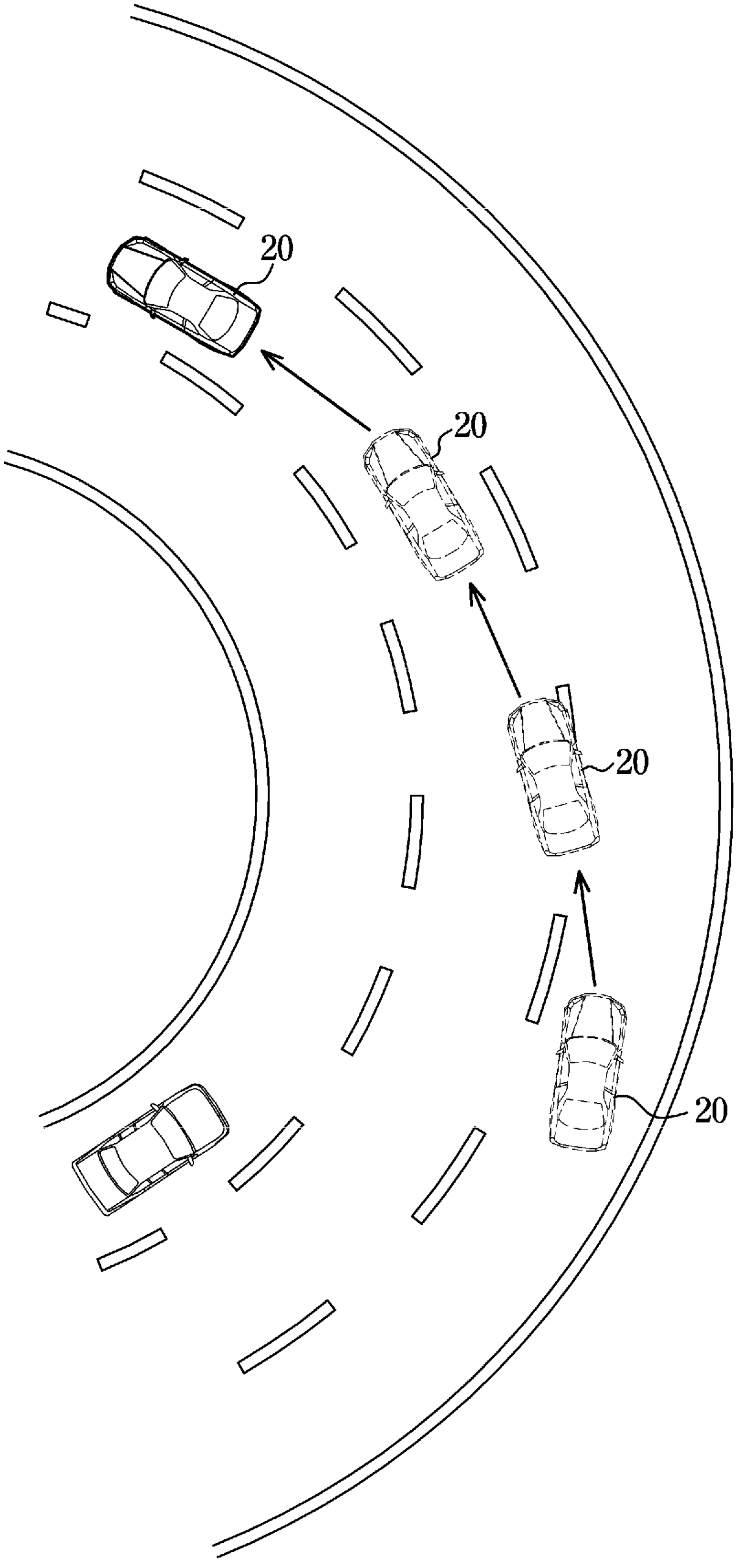
FIG. 9 is a diagram illustrating a target vehicle changing lanes without deceleration on a sharp curve of a low-traffic road segment, in a server.

FIG. 9 is a diagram illustrating a target vehicle changing lanes without deceleration on a sharp curve of a low-traffic road segment, in one or more computing devices (e.g., a server, a vehicle, etc.).

Referring to FIG. 9, if only the driving information of the target vehicle 20 is considered, changing lanes without slowing down in a sharp curve section of a low-traffic road segment may be a very dangerous driving behavior. However, if the target vehicle 20 only drives at a constant speed, it may be incorrectly determined (e.g., judged) as safe driving and the dangerous driving instance may not be reflected in the safe driving index.

However, by utilizing the safety class of the road segment and the existing speed distribution, if the driver does not reduce speed while changing lanes in a sharp curve section with low-traffic road segment, it may be determined as dangerous driving and reflected in the safe driving index.

In this way, the driving pattern of the target vehicle 20 may be compared with the driving patterns of other vehicles 30 previously passing the same road segment, the driving pattern difference can be evaluated by determining whether the deviation is above a deviation threshold according to the comparison result, and the safe driving index may be determined based on the driving pattern difference.

According to an aspect of the disclosure, there is provided a server, including: communicator configured to communicate with a target vehicle and a plurality of vehicles; and a controller electrically connected to the communicator, wherein the controller is configured to collect vehicle data of the target vehicle and the plurality of vehicles, determine a traffic volume in an area in which the target vehicle is traveling, based on the collected vehicle data, determine a reference driving pattern based on the traffic volume in the area in which the target vehicle is traveling, determine a driving pattern of the target vehicle based on the vehicle data of the target vehicle, compare the driving pattern of the target vehicle with the reference driving pattern, and determine a safe driving index of the target vehicle based on a driving pattern difference between the driving pattern of the target vehicle and the reference driving pattern.

When the traffic volume in the area in which the target vehicle is traveling is greater than a preset traffic volume, the controller may be configured to determine the reference driving pattern as an average driving pattern of the vehicles traveling in an area the same as the area in which the target vehicle is traveling.

The controller may be configured to determine the reference driving pattern as an average driving pattern of vehicles traveling in a road segment the same as a road segment in which the target vehicle is travelling during the same time period as the target vehicle.

The controller may be configured to determine the average driving pattern based on at least one of a speed and a steering angle of the vehicles traveling in the same road segment during the same time period.

When the traffic volume in the area in which the target vehicle is traveling is less than a preset traffic volume, the controller may be configured to determine the reference driving pattern as the average driving pattern of vehicles previously traveled the area where the target vehicle is traveling.

The controller may be configured to determine the average driving pattern based on at least one of a speed and a steering angle of vehicles previously traveled a road segment the same as a road segment in which the target vehicle is traveling.

When the traffic volume in the area in which the target vehicle is traveling is less than a preset traffic volume, the controller may be configured to determine the reference driving pattern as a driving pattern according to a safety class of the road segment in which the target vehicle is traveling.

The controller may be configured to determine a risk level according to the safety class of the road segment in which the target vehicle is traveling, determine a safe driving pattern according to the risk level, and determine the safe driving pattern as the reference driving pattern.

The controller may be configured to determine a preset driving pattern corresponding to a traffic volume of a road segment in which the target vehicle is traveling as the reference driving pattern.

The controller may be configured to determine the traffic volume of the road segment in which the target vehicle is traveling based on a vehicle data count of vehicles traveling on a road segment during the same time period.

According to an aspect of the disclosure, there is provided a method of controlling a server including: collecting vehicle data of a target vehicle and the plurality of vehicles; determining a traffic volume in an area in which the target vehicle is traveling, based on the collected vehicle data; determining a reference driving pattern based on the traffic volume in the area in which the target vehicle is traveling; determining a driving pattern of the target vehicle based on the vehicle data of the target vehicle; comparing the driving pattern of the target vehicle with the reference driving pattern; and determining a safe driving index of the target vehicle based on a driving pattern difference between the driving pattern of the target vehicle and the reference driving pattern.

The determining of the reference driving pattern may include, when the traffic volume in the area in which the target vehicle is traveling is greater than a preset traffic volume, determining the reference driving pattern as an average driving pattern of the vehicles traveling in an area the same as the area in which the target vehicle is traveling.

The determining of the reference driving pattern may include determining the reference driving pattern as an average driving pattern of vehicles traveling in a road segment the same as a road segment in which the target vehicle is traveling during the same time period as the target vehicle.

The determining of the reference driving pattern may include determining the average driving pattern based on at least one of a speed and a steering angle of the vehicles traveling in the same road segment during the same time period.

The determining of the reference driving pattern may include, when the traffic volume in the area in which the target vehicle is traveling is less than a preset traffic volume, determining the reference driving pattern as an average driving pattern of vehicles previously traveled the area in which the target vehicle is traveling.

The determining of the reference driving pattern may include determining the average driving pattern based on at least one of a speed and a steering angle of vehicles previously traveled a road segment the same as a road segment in which the target vehicle is traveling.

The determining of the reference driving pattern may include, when a traffic volume in the area in which the target vehicle is traveling is less than a preset traffic volume, determining the reference driving pattern as a driving pattern according to a safety class of a road segment in which the target vehicle is traveling.

The determining of the reference driving pattern may include determining a risk level according to the safety class of the road segment in which the target vehicle is traveling, determining a safe driving pattern according to the risk level, and determining the safe driving pattern as the reference driving pattern.

The determining of the reference driving pattern may include determining a preset driving pattern corresponding to a traffic volume of a road segment in which the target vehicle is traveling as the reference driving pattern.

The determining of the traffic volume of the area in which the target vehicle is travelling may include determining the traffic volume of the road segment in which the target vehicle is traveling based on a vehicle data count of vehicles traveling on a road segment the same as a road segment in which the target vehicle is traveling during the same time period as the target vehicle.

As is apparent from the above, according to the disclosure, one or more computing devices (e.g., the server, a vehicle, etc.) and the control method thereof can determine a driver's safe driving index more accurately and reliably by reflecting actual road conditions and actual driving patterns.

Meanwhile, the aforementioned controller and/or its constituent components may include at least one processor/microprocessor(s) combined with a computer-readable recording medium storing a computer-readable code/algorithm/software.

The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed features may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SSD), a silicon disk drive (SDD), a read only memory (ROM), a compact disc read only memory (CD-ROM), a magnetic tape, a floppy disk, an optical recording medium, and the like.

What is claimed is:

1. A computing device comprising:

a communication device configured to communicate with a target vehicle and a plurality of vehicles; and a controller coupled to the communication device, wherein the controller is configured to:

generate a first control message to instruct the target vehicle to transmit first vehicle data to the computing device, and generate at least one second control message to instruct the plurality of vehicles to transmit second vehicle data to the computing device, collect the first vehicle data of the target vehicle and the second vehicle data of the plurality of vehicles, determine, based on the first vehicle data and the second vehicle data, a traffic volume in an area in which the target vehicle is traveling, compare the traffic volume in the area in which the target vehicle is traveling to a preset traffic volume, determine, based on the comparison of the traffic volume in the area in which the target vehicle is traveling to the preset traffic volume, a reference driving pattern, determine, based on the first vehicle data, a driving pattern of the target vehicle, compare the driving pattern of the target vehicle with the reference driving pattern, determine, based on a driving pattern difference between the driving pattern of the target vehicle and the reference driving pattern, a safe driving index of the target vehicle, and transmit the safe driving index of the target vehicle to at least one device associated with at least one of: autonomous controls, traffic controls, or vehicle insurance.

2. The computing device according to claim 1, wherein, based on the traffic volume in the area in which the target vehicle is traveling being greater than the preset traffic volume, the controller is configured to determine the reference driving pattern as an average driving pattern of vehicles traveling in the area in which the target vehicle is traveling.

3. The computing device according to claim 1, wherein the controller is configured to determine the reference driving pattern as an average driving pattern of vehicles traveling, during a time period, on a road segment on which the target vehicle is travelling during the time period.

4. The computing device according to claim 3, wherein the controller is configured to determine the average driving pattern based on at least one of a speed or a steering angle of the vehicles traveling in the road segment during the time period.

5. The computing device according to claim 1, wherein, based on the traffic volume in the area in which the target vehicle is traveling being less than the preset traffic volume, the controller is configured to determine the reference driving pattern as an average driving pattern of vehicles previously traveled in the area in which the target vehicle is traveling.

6. The computing device according to claim 5, wherein the controller is configured to determine the average driving pattern based on at least one of a speed or a steering angle of vehicles previously traveled on a road segment on which the target vehicle is traveling.

7. The computing device according to claim 1, wherein, based on the traffic volume in the area in which the target vehicle is traveling being less than the preset traffic volume, the controller is configured to determine the reference driving pattern as a driving pattern according to a safety class of a road segment in which the target vehicle is traveling.

8. The computing device according to claim 7, wherein the controller is configured to determine a risk level according to the safety class of the road segment in which the target vehicle is traveling, determine a safe driving pattern according to the risk level, and determine the safe driving pattern as the reference driving pattern.

9. The computing device according to claim 1, wherein the controller is configured to determine a preset driving pattern corresponding to a traffic volume of a road segment on which the target vehicle is traveling as the reference driving pattern.

10. The computing device according to claim 1, wherein the controller is configured to:
- transmit the safe driving index and the driving pattern of the target vehicle to the at least one device, and
- cause the at least one device to change, based on the safe driving index of the target vehicle being a dangerous safe driving index, at least one autonomous driving pattern of at least one second vehicle in accordance with a dangerous driving pattern of the target vehicle.

11. A method performed by a computing device, the method comprising:
- generating a first control message to instruct a target vehicle to transmit first vehicle data to the computing device, and generating at least one second control message to instruct a plurality of vehicles to transmit second vehicle data to the computing device;
- collecting, by the computing device, the first vehicle data of the target vehicle and the second vehicle data of the plurality of vehicles;
- determining, based on the first vehicle data and the second vehicle data, a traffic volume in an area in which the target vehicle is traveling;
- comparing the traffic volume in the area in which the target vehicle is traveling to a preset traffic volume;
- determining, based on the comparison of the traffic volume in the area in which the target vehicle is traveling to the preset traffic volume, a reference driving pattern;
- determining, based on the first vehicle data, a driving pattern of the target vehicle;
- comparing the driving pattern of the target vehicle with the reference driving pattern;
- determining, based on a driving pattern difference between the driving pattern of the target vehicle and the reference driving pattern, a safe driving index of the target vehicle; and
- transmitting the safe driving index of the target vehicle to at least one device associated with at least one of: autonomous controls, traffic controls, or vehicle insurance.

12. The method of claim 11, wherein the determining of the reference driving pattern comprises:
- based on the traffic volume in the area in which the target vehicle is traveling being greater than the preset traffic volume, determining the reference driving pattern as an average driving pattern of vehicles traveling in the area in which the target vehicle is traveling.

13. The method of claim 11, wherein the determining of the reference driving pattern comprises determining the reference driving pattern as an average driving pattern of vehicles traveling, during a time period, on a road segment on which the target vehicle is traveling during the time period.

14. The method of claim 13, wherein the determining of the reference driving pattern comprises determining the average driving pattern based on at least one of a speed or a steering angle of the vehicles traveling in the road segment during the time period.

15. The method of claim 11, wherein the determining of the reference driving pattern comprises:
- based on the traffic volume in the area in which the target vehicle is traveling being less than the preset traffic volume, determining the reference driving pattern as an average driving pattern of vehicles previously traveled in the area in which the target vehicle is traveling.

16. The method of claim 15, wherein the determining of the reference driving pattern comprises determining the average driving pattern based on at least one of a speed or a steering angle of vehicles previously traveled on a road segment on which the target vehicle is traveling.

17. The method of claim 11, wherein, the determining of the reference driving pattern comprises:
- based on the traffic volume in the area in which the target vehicle is traveling being less than the preset traffic volume, determining the reference driving pattern as a driving pattern according to a safety class of a road segment in which the target vehicle is traveling.

18. The method of claim 17, wherein the determining of the reference driving pattern comprises:
- determining a risk level according to the safety class of the road segment in which the target vehicle is traveling;
- determining a safe driving pattern according to the risk level; and
- determining the safe driving pattern as the reference driving pattern.

19. The method of claim 11, wherein the determining of the reference driving pattern comprises determining a preset driving pattern corresponding to a traffic volume of a road segment on which the target vehicle is traveling as the reference driving pattern.

20. The method of claim 11, wherein the transmitting the safe driving index of the target vehicle comprises transmitting the safe driving index and the driving pattern of the target vehicle to the at least one device, and wherein the method further comprises causing the at least one device to change, based on the safe driving index of the target vehicle being a dangerous safe driving index, at least one autonomous driving pattern of at least one second vehicle in accordance with a dangerous driving pattern of the target vehicle.

* * * * *